United States Patent [19]
Martinenas

[11] Patent Number: 5,841,089
[45] Date of Patent: Nov. 24, 1998

[54] SMALL SIZE TUBE WELDING APPARATUS

[75] Inventor: Linas A. Martinenas, Santa Clarita, Calif.

[73] Assignee: Astro Arc Polysoude, Incorporated, Pacoima, Calif.

[21] Appl. No.: 892,276

[22] Filed: Jul. 14, 1997

[51] Int. Cl.[6] ................................................. B23K 9/12
[52] U.S. Cl. ............................ 219/60 A; 219/125.11
[58] Field of Search .................... 219/60 A, 125.11, 219/61

[56] References Cited

U.S. PATENT DOCUMENTS

| | | | |
|---|---|---|---|
| 3,395,262 | 7/1968 | Kazlauskas | 219/60 A |
| 3,400,237 | 9/1968 | Kazlauskas | 219/60 A |
| 3,823,298 | 7/1974 | Rohrberg et al. | 219/60 A |
| 4,379,215 | 4/1983 | Rohrberg | 219/60 A |
| 4,841,115 | 6/1989 | Severin et al. | 219/60 A |
| 4,857,690 | 8/1989 | Kazlauskas | 219/60 A |
| 5,136,134 | 8/1992 | Benway et al. | 219/60 A |
| 5,288,963 | 2/1994 | Jusionis | 219/60 A |

*Primary Examiner*—Clifford C. Shaw
*Attorney, Agent, or Firm*—Jack C. Munro

[57] ABSTRACT

The subject invention is a tube welding apparatus for the welding of small tubes, such as those one-sixteenth of an inch to one-half inch in diameter. The tube welding apparatus includes a drive housing to which is supplied inert gas, cooling water and electricity. Different torch housings are to be mountable in a removably disengaged manner on the drive housing with only a single torch housing being mounted to the drive housing at any given time. The torch housing includes a rotor gear within which is mounted the welding electrode with this rotor gear to be rotatably driven about the tube that is to be welded. Also mounted within the torch housing is an electrical brush which is to be in engagement with the rotor gear with the brush also including electrical connecting plugs which are to engage in a mating manner with sockets formed on the drive housing on which mounts the torch housing on the drive housing. The torch housing is to include a heat sink to dissipate excess heat from the welding procedure to keep the torch housing as cool as possible. The torch housing includes a gas passage arrangement for supplying inert gas to the area of the welding electrode.

18 Claims, 12 Drawing Sheets

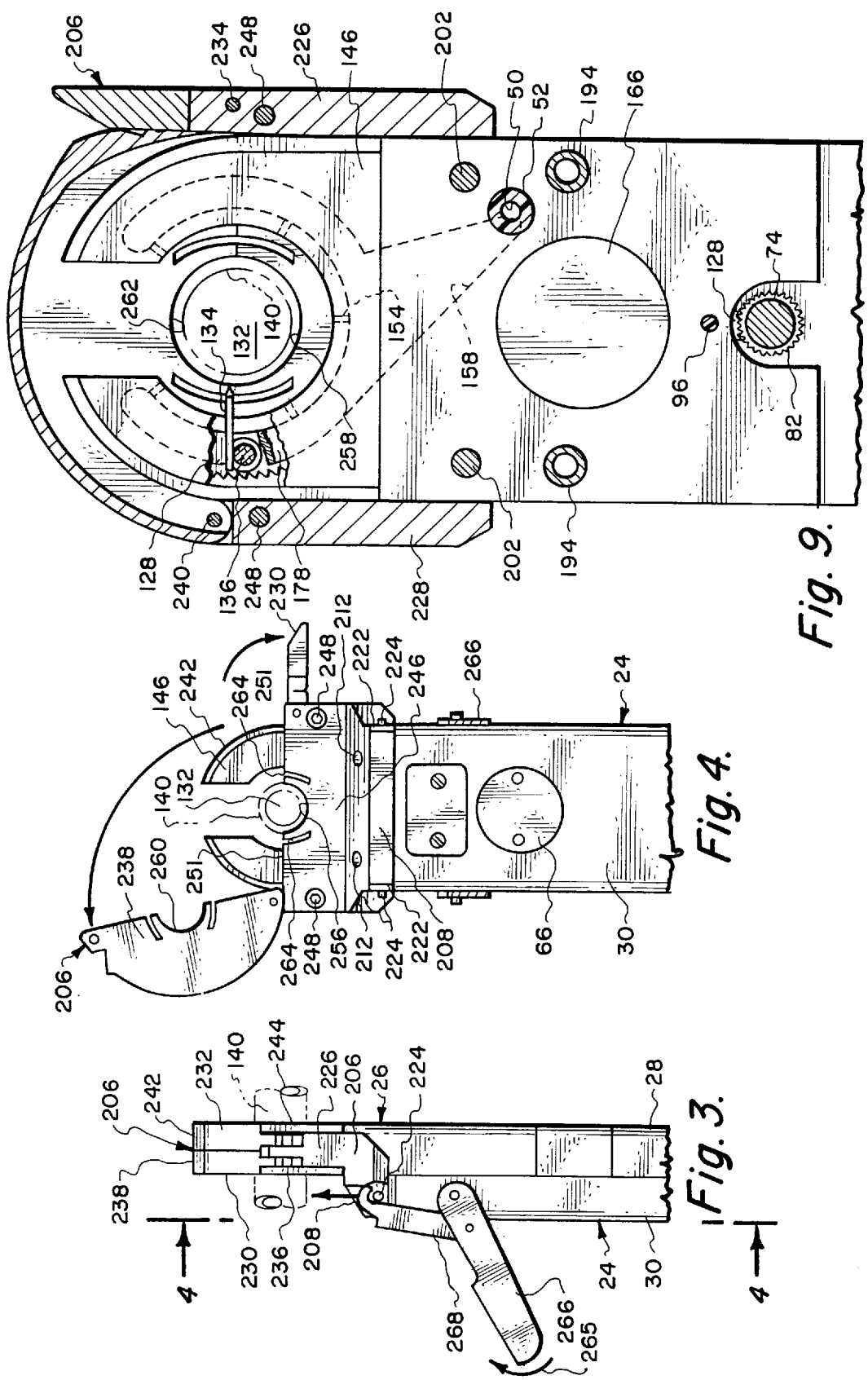

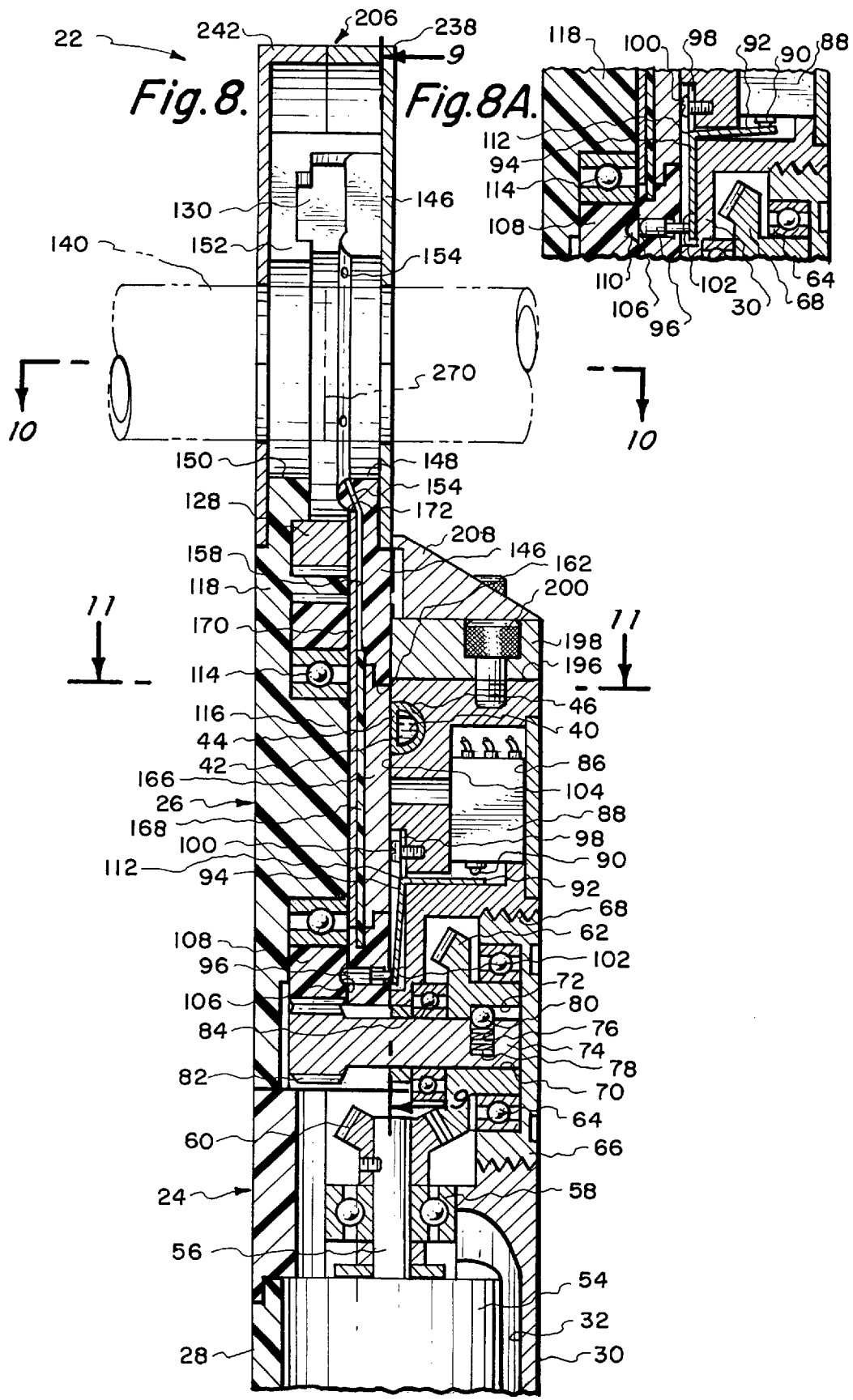

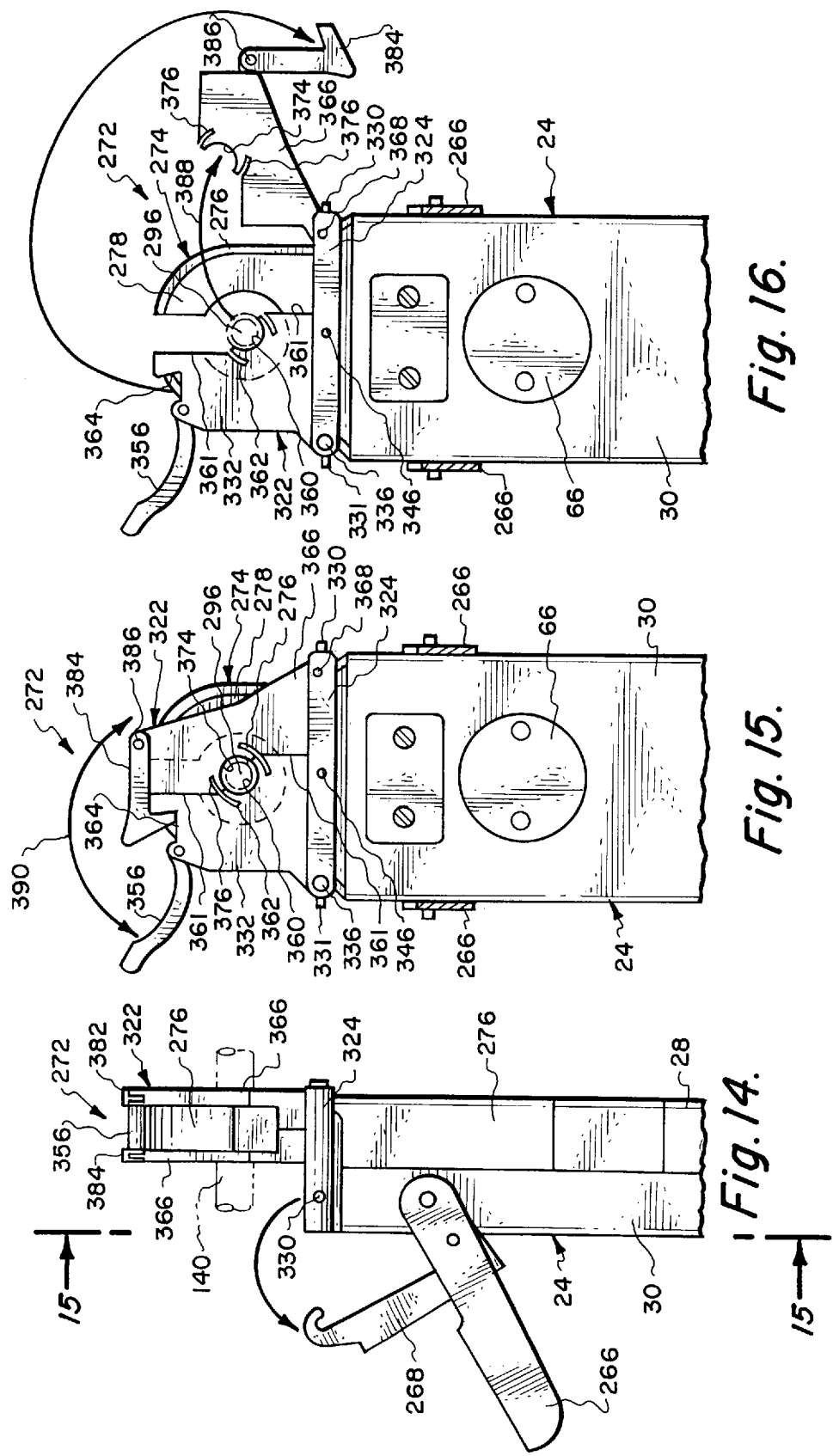

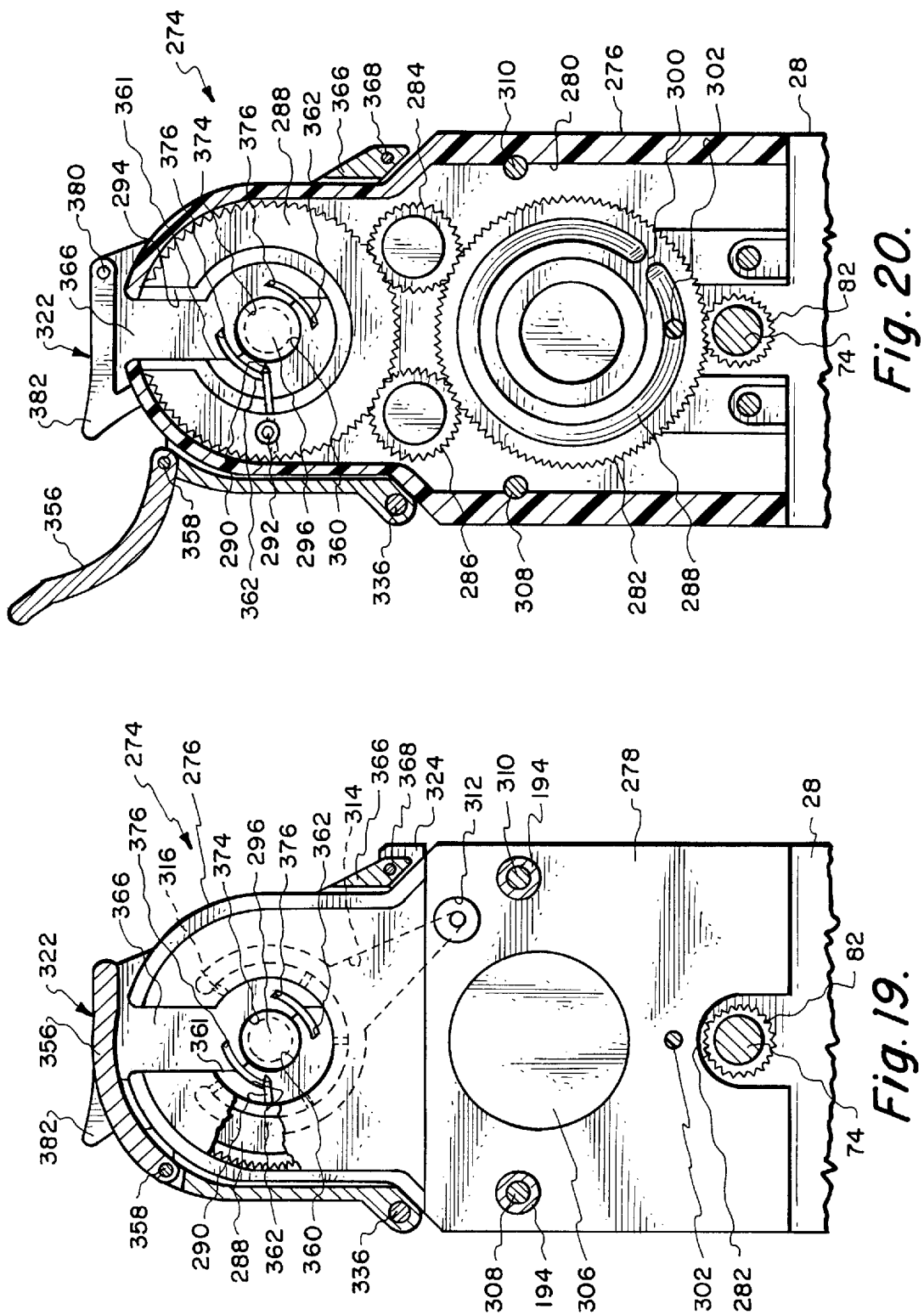

SMALL SIZE TUBE WELDING APPARATUS

BACKGROUND OF THE INVENTION

1) Field of the Invention

This invention relates to the welding of separate, coaxially located, edge abutting, metallic, cylindrical tubular sections hereinafter referred to as tubes. More particularly, the field of this invention is directed to an apparatus for automatic, gas tungsten, arc welding along a circumferential path thereby securing separate tubes together forming essentially an integral, totally enclosed tube.

2) Description of the Prior Art

The use of apparatuses to effect automatic welding of tubes has long been known. A common such apparatus is what is shown and described in the U.S. Pat. No. 4,857,690 and U.S. Pat. No. 3,400,237. The apparatus of the present invention is to employ a weld technique similar to the aforesaid patents and reference may be had to the aforesaid patents for background information of the welding technique.

Within the prior art, there are numerous types of compact, portable welding apparatuses for joining together sections of tubing where limited working space is available as, for example, in aircraft assembly operations. These handheld, compact, portable welding apparatuses are particularly useful for in-place welding of tubing in environmentally confined locations since these welding apparatuses require very little working space around the joint to be welded.

However, certain drawbacks have been encountered in the prior art devices. Although the portable cassette type of welding apparatuses of the prior art are intended to be used in confined quarters, such are still of a size that limits their usage for that purpose. If the welding apparatus can be made still smaller, then possibly it could possibly be usable in even more confined quarters that have prevented their use in the past.

Also, in the past, welding apparatuses have not been commonly designed to use interchangeable torch housings with one torch housing to connect to one diameter range of tubing and another torch housing to connect to another diameter range of tubing. The torch housings are to be removably mounted to a drive housing of the welding apparatus. Within the aforementioned U.S. Pat. No. 4,857,690, the welding apparatus was constructed of a drive housing and a torch housing. The drive housing contains the structure that is common to the welding procedure regardless of the size of the tube being welded. The torch housing could comprise different torch housings that could be removably connected to the drive housing. The connection between the torch housing and the drive housing would be by a quick disconnect basis. However, even the physical size of the welding head apparatus within U.S. Pat. No. 4,857,690 was such that there was a limited field of usage. It would be highly desirable if a welding head apparatus could be designed to be even smaller in size than that shown and disclosed within U.S. Pat. No. 4,857,690.

SUMMARY OF THE INVENTION

The subject invention is a portable, hand holdable, small size welding apparatus designed for welding tubes. Common sizes for such tubes would be from one-sixteenth of an inch in diameter to one-half inch in diameter. The welding apparatus includes a drive housing with this drive housing having a female electrical connection arrangement. A torch housing having a male electrical connection arrangement is to removably engage with the female electrical connection arrangement. The drive housing is to be able to connect with different torch housings such as a torch housing that is designed to weld tubes from one-sixteenth of an inch to one-quarter inch in diameter to another torch housing that is designed to weld tubes from one-quarter inch to one-half inch in diameter. Each torch housing is constructed of an internal chamber, and within that internal chamber is rotary mounted an electrically conductive rotor gear. The rotor gear is not continuous and defines a cut-out area with the center portion of the rotor gear being open. The tubes to be welded are to be located within the center portion of the rotor gear. The welding electrode is mounted in the rotor gear. An electrically conductive brush is biased into tight contact with the rotor gear. The electrical conducting brush has the male electrical connection arrangement formed thereon. A heat sink is formed within the torch housing which is to function to dissipate excess heat created during the welding procedure. The torch housing includes a sensor arrangement to stop rotation of a rotor gear. The cut-out area of the rotor gear is to be aligned with a torch housing opening for tube removal and installation. A tube clamping assembly is fixedly mounted onto the drive housing by means of a toggle clamp assembly.

The primary objective of the present invention is to construct a welding apparatus for small sizes of tubes such as from one-sixteenth of an inch in diameter to one-half inch in diameter with the welding apparatus being of minimal size thereby permitting the welding apparatus to be used in exceedingly confined quarters that heretofore made the use of automatic welding equipment prohibitive.

Another objective of the present invention is to construct a tube welding apparatus which is exceedingly efficient for dissipating excess heat created during the welding procedure thereby minimizing the amount of down time for cooling of the welding apparatus between welds that has been required of prior art types of welding apparatuses when performing a plurality of welds.

Another objective of the present invention is to construct a welding apparatus which is of relatively simple construction and therefore can be used by technicians having minimal training in the performing of such welds.

BRIEF DESCRIPTION OF THE DRAWINGS

FIG. 3 is a right side elevational view similar to FIG. 2 of a portion of the first embodiment of the tube welding apparatus of this invention showing the toggle clamp arrangement that is utilized to fixedly secure the torch housing onto the drive housing in an unlocked position;

FIG. 4 is a front elevational view of the first embodiment of the tube welding apparatus of this invention taken along line 4—4 of FIG. 3 also showing the tube clamping arrangement in the open position permitting removal of the tube from the welding apparatus or permitting engagement of tubes to be welded;

FIG. 8 is a cross-sectional view through the torch housing and tube clamping assembly of the first embodiment of the tube welding apparatus of this invention taken along line 8-8 of FIG. 1 showing a follower in engagement with a driven gear with the follower to cause activation of a switch that is shown in the position to permit welding to occur;

FIG. 8A is a cross-sectional view showing the follower in the position of operating the switch;

FIG. 9 is a partial cross-sectional view and partial cut-away view showing in more detail the torch housing which is utilized in conjunction with the first embodiment of the welding apparatus of this invention;

FIG. 14 is a right side elevational view showing the toggle clamp arrangement in the open position which is utilized to fixedly secure the torch housing onto the drive housing;

FIG. 15 is a front elevational view of the second embodiment of the tube welding apparatus of this invention taken along line 15—15 of FIG. 14 also showing an intermediate opening position of the tube clamping arrangement utilized in conjunction with the second embodiment of the tube welding apparatus of this invention;

FIG. 16 is a view similar to FIG. 15 but showing the tube clamping arrangement in the completely open position which permits entry of tubes to be welded and removal of the welded tube;

FIG. 19 is a view, partly in cross-section and partly cut-away, through the torch housing of the second embodiment of the tube welding apparatus of this invention; and FIG. 20 is a cross-sectional view through the torch housing of the second embodiment of the tube welding apparatus of this invention with the tube welding apparatus in the same position as in FIG. 15.

DETAILED DESCRIPTION OF THE PREFERRED EMBODIMENTS

Figure 1:
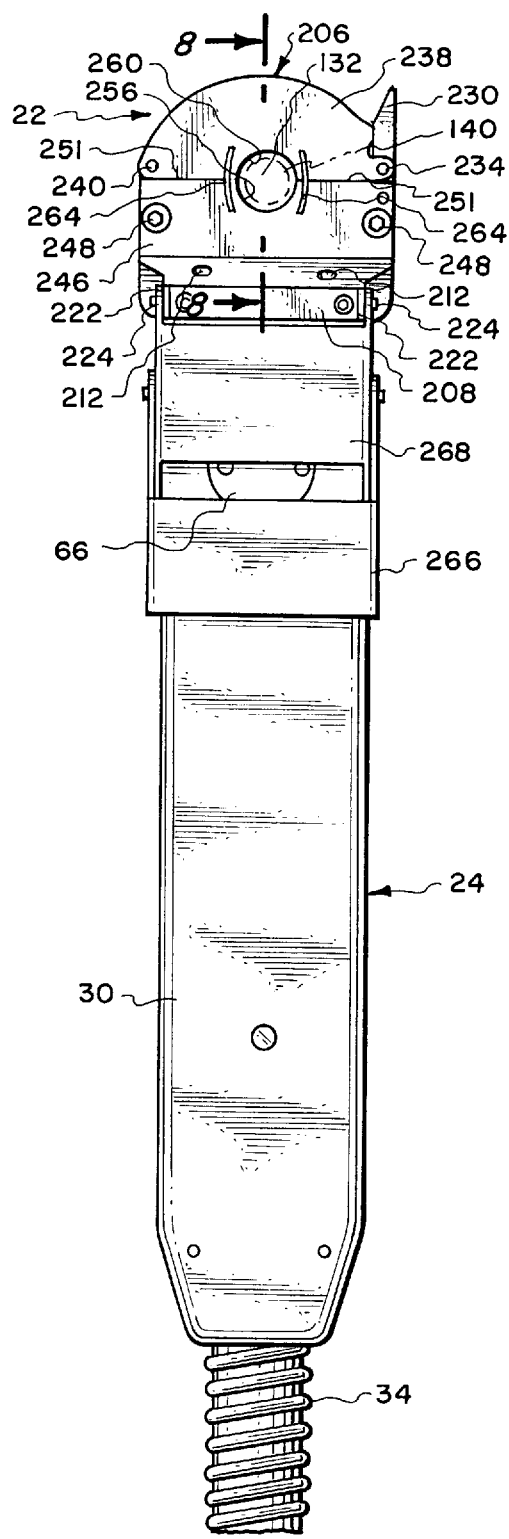
FIG. 1 is a side elevational view of the first embodiment of the small size tube welding apparatus of this invention showing the welding apparatus in the closed position which would be the position of the apparatus during the welding procedure.

Referring particularly to FIGS. 1–11 of the drawings, there is shown the first embodiment 22 of the tube welding apparatus of this invention. The first embodiment 22 is composed of drive housing 24 and a torch housing 26. The drive housing 24 is formed of connected plastic part 28 and aluminum part 30. The parts 28 and 30 are connected together in a facing relationship and held in that position by means of fasteners which are not shown. The plastic part 28 and aluminum part 30, when connected together, form an internal compartment 32. Cooling water, inert gas and electricity are to be supplied by supply conduit 34 to the internal compartment 32. It is to be understood that the supply conduit 34 will be connected to appropriate sources for cooling water, electricity, and the inert gas. The inert gas is usually argon, but other gases could be used. It is common that the supply conduit 34 will be connected to a computer apparatus which is also not shown.

The electricity from the supply conduit 34 is supplied to sockets 36 and 38. The sockets 36 and 38 make up a female electrical connection arrangement. The cooling water 42 is supplied within passage 40 formed within U-shaped pipe 44. U-shaped pipe 44 is mounted within recess 46 formed within the aluminum part 30. The surface of pipe 49 that faces outwardly is flush with the surface of aluminum part 30.

The inert gas is supplied within passage 48 formed within the aluminum part 30. From the passage 48, the inert gas is moved through through opening 50 formed within sleeve 52 which is mounted within the aluminum part 30. Power is to be supplied from a motor 54 which is mounted within the internal compartment 32. The motor 54 is to cause rotation of an output shaft 56 which is mounted by ball bearing 58 between the parts 28 and 30. Fixedly mounted on the output shaft 56 is a first bevel gear 60. The first bevel gear 60 is in continuous engagement with a second bevel gear 62. The second bevel gear 62 is rotatably mounted by ball bearing assembly 64 within a threaded cap 66. Threaded cap 66 is threadably mounted within internal threaded opening 68 mounted within the part 30. The threaded cap 66 can be disengaged from the internally threaded opening 68 for reasons of maintenance or repair.

The second bevel gear 62 includes a center hole 70. Connecting with the center hole 70 is a keyway groove 72. Mounted within the center hole 70 is a mounting shaft 74. The mounting shaft 74 includes a transverse hole 76. Within the transverse hole 76 is located a coil spring 78 and a ball 80. The ball 80 is to engage with the keyway groove 72 to lockingly connect together the second bevel gear 62 and the mounting shaft 74. The outer end of the mounting shaft 74 is integrally connected to a spur or drive gear 82. Spur or drive gear 82 is rotationally mounted by means of ball bearing assembly 84 to the part 30.

Formed within the part 30 is a cavity 86. Mounted within the cavity 86 is a switch housing 89. The switch 88 has an actuating button 90. The actuating button 90 is to be in continuous contact with the inner leg 92 of a right angle plate which also includes an outer leg 94. The outer leg 94 is to be in continuous contact with the inner end of a follower pin 96. It is to be noted that the right angle plate is not precisely at a right angle but is slightly obtuse. The outer leg 94 includes an extension 98. The extension 98 is mounted by fastener 100 to the part 30. The outer leg 94, extension 98 and fastener 100 are located within recess 102 formed within abutting face 104 of the part 30. It is the function of the fastener 100 to fixedly mount in position the right angle plate.

The outer end of the follower pin 96 is to ride within annular groove 106 of a ring gear 108. The annular groove 106 is almost circular with the exception of a hiatus in the form of a ridge 110. Upon the follower pin 96 coming into contact with the ridge 110, pressure is applied against the outer leg 94 pushing such toward part 30. The direction of movement of the follower pin 96 is transverse to the plane of rotation of the ring gear 108. The movement of the follower pin 96 will cause the right angle plate to pivot about apex 112 which will result in the inner leg 92 to be moved inwardly against the actuating button 90 and depress such. This will cause the switch 88 to be activated which will signal to the control logic (not shown) of the power supply (not shown) that the position of the rotor gear 128 is in the home position. The home position is defined when the cut-out area 130 is aligned with enlarged holes 148 and 150. Switch 88 also activates a light (not shown) to indicate to the user that the home position is achieved.

Internally mounted within the ring gear 108 is a ring bearing 114. The ring bearing 114 is mounted on circular raised area 116 by a cover 118 of the torch housing 26. The cover 118 also includes smaller raised areas 120 and 122. Rotatably mounted on the raised area 120 is an idler gear 124 with the second idler gear 126 being rotatably mounted on the raised area 122. The idler gears 124 and 126 continuously mesh with the ring gear 108.

Meshing with the idler gears 124 and 126 is a rotor gear 128. The rotor gear 128 is not continuous but includes a cut-out area 130. The cut-out area 130 connects with an enlarged central cut-out area of the rotor gear 128 which is defined as the welding chamber 132. Mounted within the wall of the welding chamber 132 is a welding electrode 134. The welding electrode 134 is fixedly mounted by means of set screw 136 to the rotor gear 128. The rotor gear 128 is mounted within recess area 138 of the cover 118.

The purpose of the cut-out area 130 is to permit lateral entry of a tube 140 into the welding chamber 132. The cut-out area 130 is to be aligned with cut-out area 142 of the cover 118 in order to permit the entry of the tube 140 within the welding chamber 132. The reason for the two idler gears 124 and 126 is that as the ring gear 108 is rotated, there will always be an idler gear 124 or 126 in engagement with the rotor gear 128. Therefore, when the cut-out area 130 connects with the idler gear 124, the other idler gear 126 is still maintaining the driving connection between the driven gear which comprises the ring gear 108 and the rotor gear 128. When the cut-out area 130 connects with the idler gear 126, the idler gear 124 is maintaining the driving connection between the rotor gear 128 and the ring gear 108.

The cut-out area 142 aligns with cut-out area 144 of a body housing 146. The cut-out area 142 and 144 are both smaller in size than the cut-out area 130. The body housing 146 is to be fixedly secured by appropriate fasteners with the cover 118. It is to be noted that the body housing 146 actually slips within the cover 118. With the body housing 146 connected with the cover 118, the gears 108, 124, 126 and 128 are totally enclosed. The body housing 146 includes an enlarged hole 148 which connects with the cut-out area 144. Within the cover 118, there is an enlarged hole 150 which also connects with the cut-out area 142 when enlarged holes 148 and 150 are in alignment. Within the enlarged holes 148 and 150 is located the welding chamber 132.

The body housing 146 includes a rim 152 located about the enlarged hole 148. Within the rim 152 is a plurality of spaced-apart holes 154. There are actually seven in number of the holes 154. Each of the holes 154 connects to an annular groove 156 located against the inside surface of the rim 152. The annular groove 156 is broken in the area of the cut-out area 144. The annular groove 156 connects with relief 158 formed within the inside surface of the body housing 146. The relief 158 is to receive inert gas from the enlarged opening 150 and conduct that gas through the holes 154 to be discharged into the welding chamber 132. Therefore, when welding is occurring by the electrode 134, the environment around the electrode 134 comprises an inert gas which is free of oxygen. Oxygen can drastically affect the quality of the weld produced. Therefore, it is essential to have the welding occur in an inert gas environment.

The cover 118 has an internal chamber 160 formed by the sidewalls of the cover 118. Located within the internal chamber 160 are the gears 108, 124, 126 and 128 as well as other structure which is not discussed at this time.

Mounted within the body housing 146 is a hole 164. The follower pin 96 is mounted within the hole 164. The operation of the follower pin 96 has been previously discussed. Also formed within the body housing 146 is an enclosed hole 162. Mounted within the enclosed hole 162 is a heat sink in the form of a copper plug 166. The inside surface of the copper plug 166 is in contact with a thin mica disc 168. The outer surface of the copper plug 166 is to be in direct contact with the pipe 44 and abutting face 104 of part 30. The mica disc 168 is in direct connection with a brush 170. The brush 170 comprises a thin, copper plate-like member. The heat of welding is readily conducted by the copper material and brush 170. This heat is then conducted through the mica disc 168 to the copper plug 166. From copper plug 166 the heat is conducted through the copper material of pipe 44 to be absorbed by the cooling water 42. The water 42 is constantly recirculating to and from a reservoir (not shown).

The brush 170 has a head section within which is formed enlarged opening 172. The opening 172 has a cut-out area 174 which is also to be in alignment with cut-out areas 130, 142, and 144. The enlarged opening 172 essentially divides the brush 170 into a pair of arms 176 and 178. Each arm 176 and 178 is to abut against the rotor gear 128. The brush 170 also includes a pair of plugs 180 and 182. Plug 180 is to connect with the socket 38 with plug 182 connecting with socket 36. The electrical power for the welding procedure is to be transmitted from the sockets 36 and 38, through the plugs 180 and 182, through the brush 170 to the arms 176 and 178. Arm 176 includes a slot 184 which defines a tab 186. In a similar manner, the arm 178 includes a slot 188 which defines a tab 190. The tabs 186 and 190 are bent slightly away from the surface of their respective arms 176 and 178 in a direction away from the rotor gear 128. Therefore, when the cover 118 and body housing 146 are connected together, the tabs 186 and 190 rest on housing 146 spring biasing the brush 170 into surface contact establishing a positive electrical connection and with rotor gear 128 thermal contact between the brush 170 and the rotor gear 128.

Formed within the body housing 146 is a pair of holes 192. Each hole 192 is to connect with a short sleeve 194 with there being two in number of the short sleeves 194 mounted on abutting face 104 of the drive housing 24. The short sleeves 194, engaging with the holes 192, merely function within the first embodiment 22 as alignment pins so that the exact position is always obtained of the torch housing 26 when mounted on the drive housing 24.

The outer end of the drive housing 24 includes a mounting face 196. On this mounting face 196 is mounted a mounting block 198. A fastener 200 is to be used to mount the mounting block 198 onto the mounting face 196. When the torch housing is installed in position with the drive housing 24, fasteners 202 are used to secure the torch housing 26 to the mounting block 198.

Figure 5:
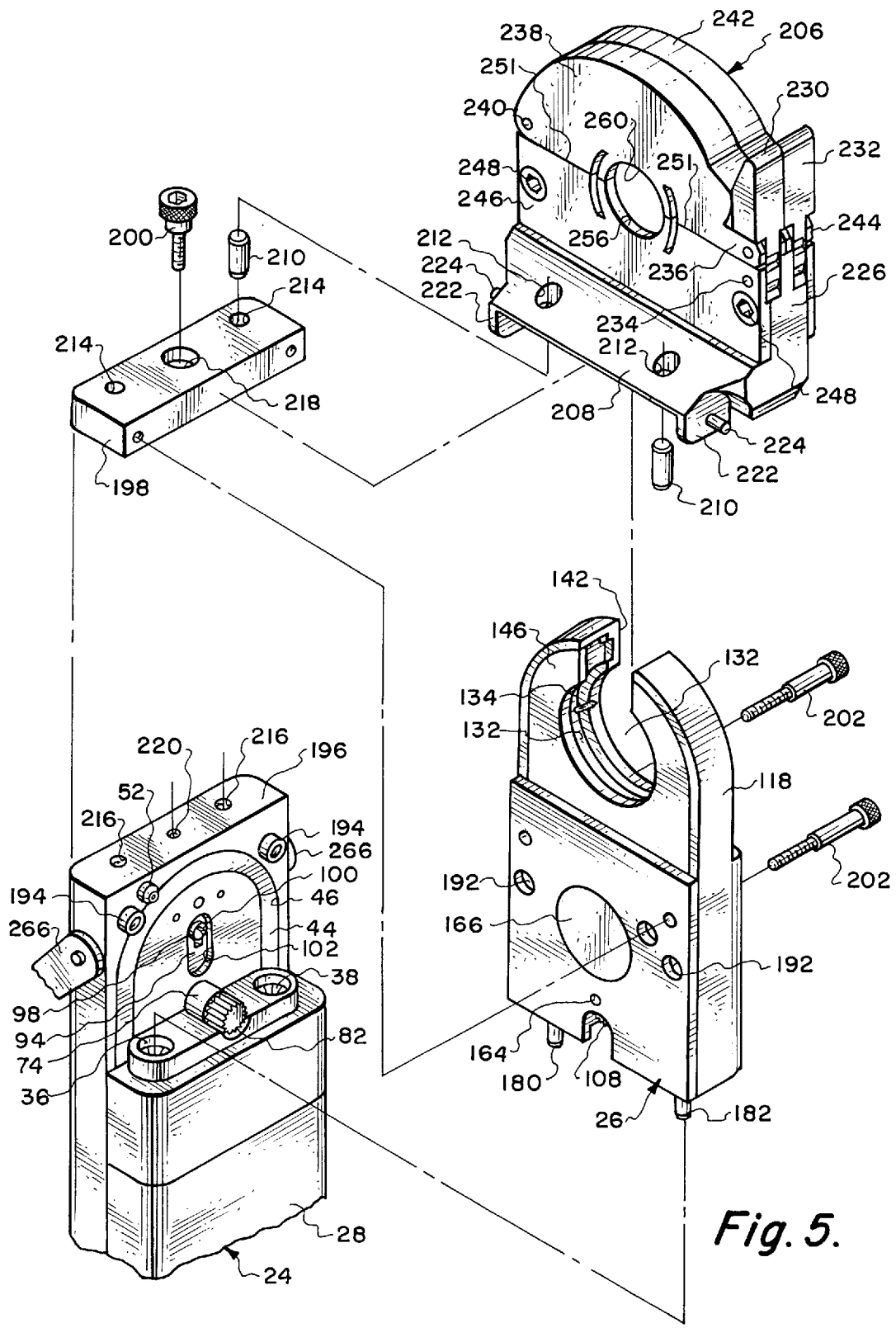
FIG. 5 is an exploded isometric view of the first embodiment of the tube welding apparatus of this invention.
Figure 6:
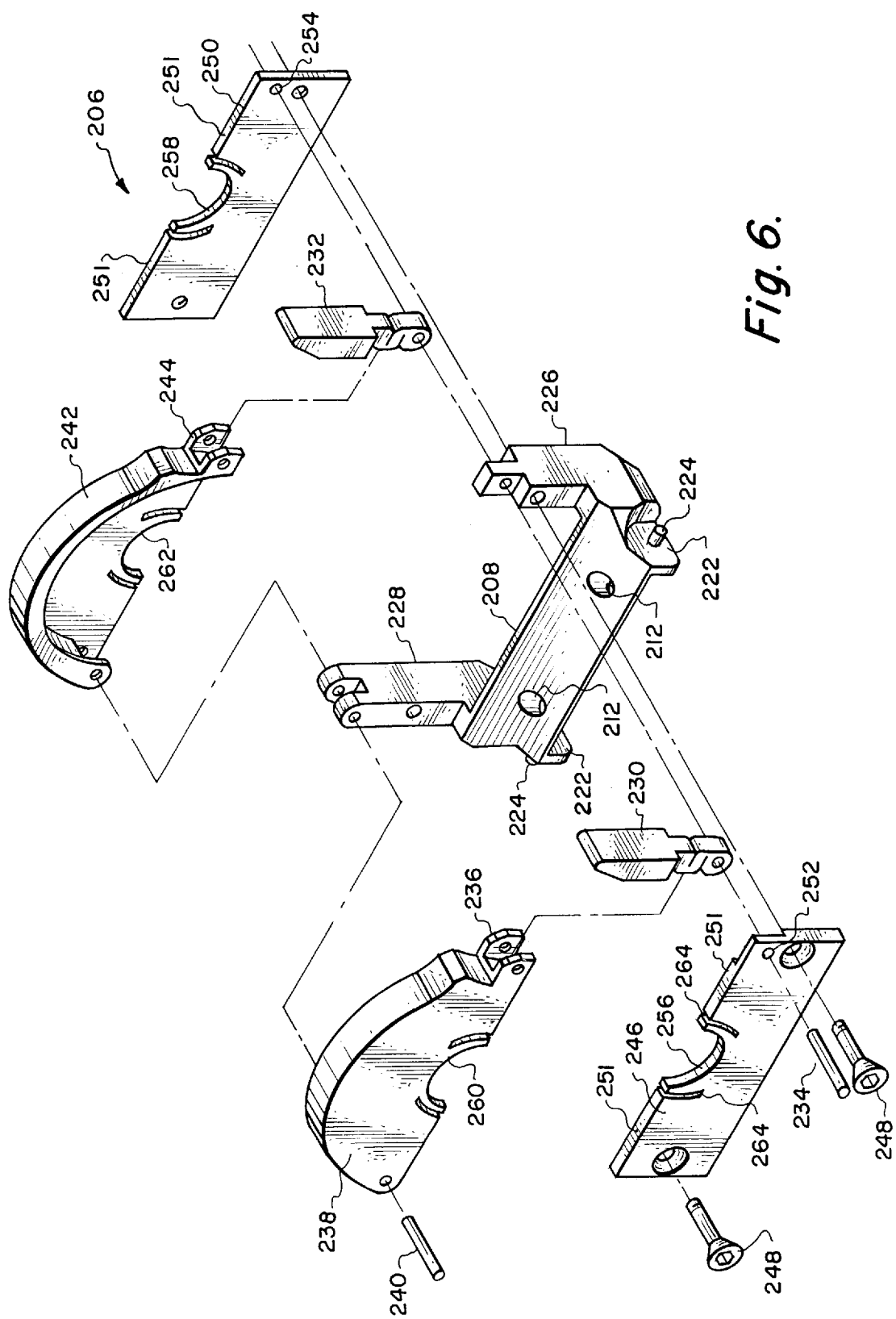
FIG. 6 is an exploded isometric view of the tube clamping assembly that is mounted in conjunction with the first embodiment of the tube welding apparatus of this invention.
Figure 7:
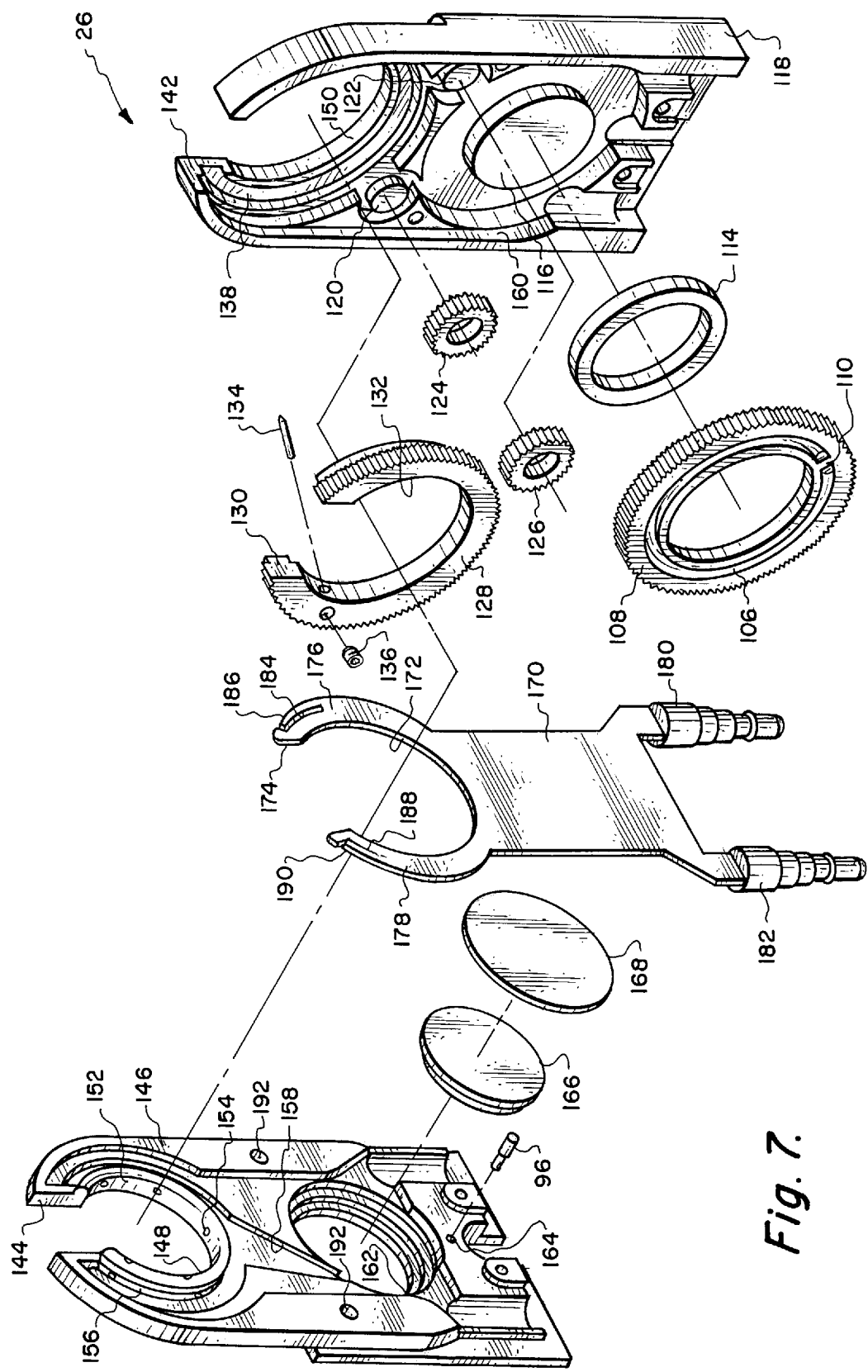
FIG. 7 is an exploded isometric view of the torch housing that is utilized in conjunction with the first embodiment of the tube welding apparatus of this invention.
Figure 10:
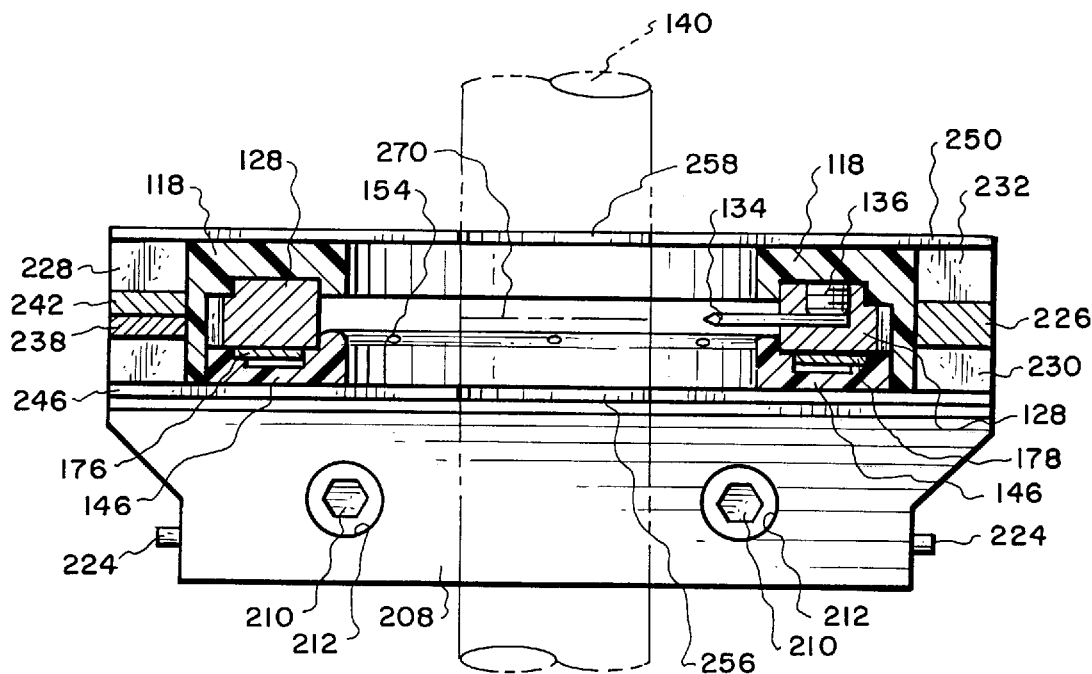
FIG. 10 is a transverse cross-sectional view through the torch housing of the first embodiment of the tube welding apparatus of this invention taken along line 10—10 of FIG. 8.
Figure 11:
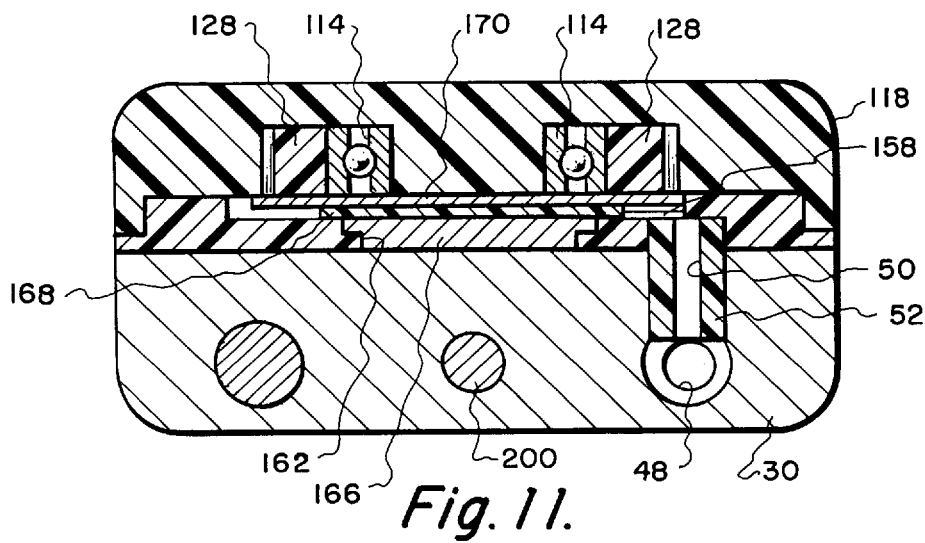
FIG. 11 is a transverse cross-sectional view through another portion of the torch housing of the first embodiment of the tube welding apparatus of this invention taken along line 11—11 of FIG. 8.
Figure 12:
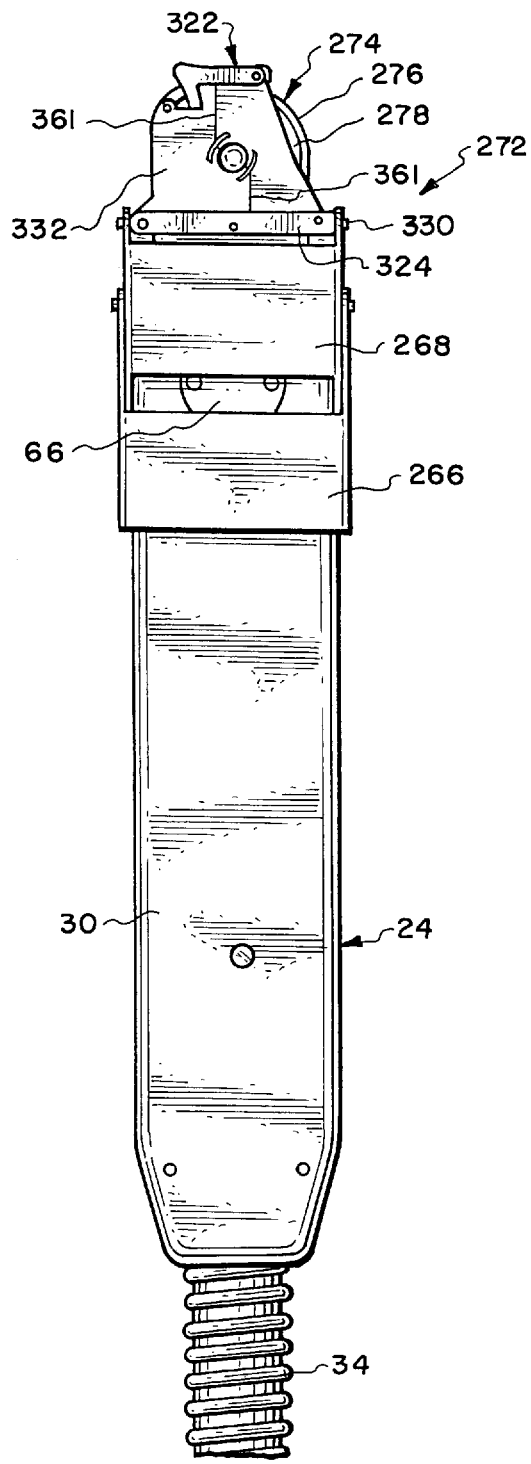
FIG. 12 is a front elevational view of the second embodiment of the tube welding apparatus of this invention showing the welding apparatus with the torch housing being fixedly secured to the drive housing.
Figure 13:
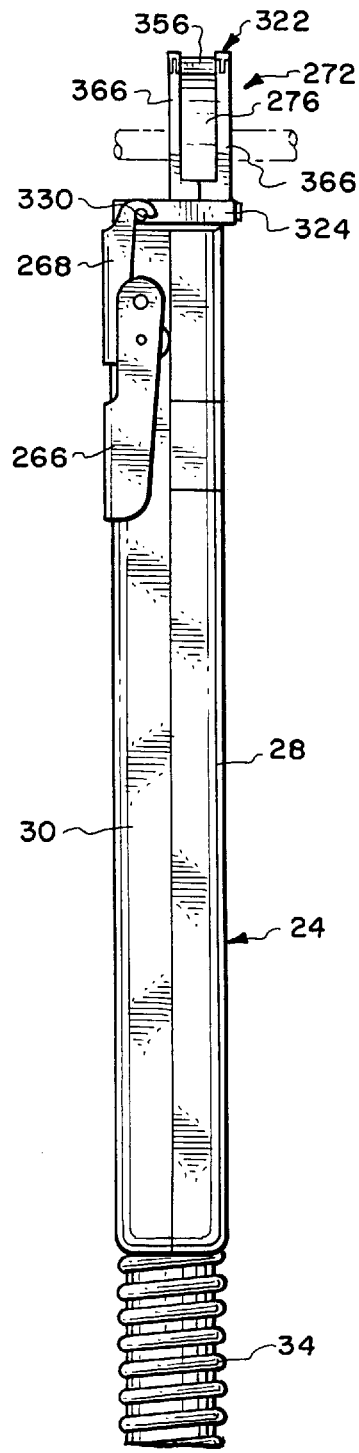
FIG. 13 is a right side elevational view of the second embodiment of the tube welding apparatus of this invention.

A tube clamping assembly 206, which includes a mounting base 208, is to be placed on mounting block 198. The fastener 200 is conducted through a hole 218 formed within the mounting block 198 and is threadably engaged with a threaded hole 220 formed within the mounting face 196. Two dowel pins 210 are used to locate mounting block 198 on face 196 and to locate mounting base 208 on block 198. Each dowel pin 210 is securely mounted by an interference fit within hole 214 of the block 198 in such a way that each pin 210 has each of its ends sticking out of the block 198. The ends of the pins 210 sticking out toward face 196 are conducted into holes 216 formed within mounting face 196. The ends of the pins 210 sticking out toward mounting base 208 are used within holes 212 formed within the mounting base 208. The mounting base 208 includes oppositely oriented sidewall flanges 222, each of which has mounted thereon a pin 224. Extending from the mounting base 208 are upstanding members 226 and 228. Typically mounted on upstanding members 226 is a pair of locking arms 230 and 232. The locking arms 230 and 232 are located in a side-by-side relationship. The locking arms 230 and 232 are pivotally mounted on the upstanding member 226 by means of a pivot pin 234. Each of the locking arms 230 and 232 can be pivoted from a locking position shown in FIGS. 1, 2 3, 5 and 9 to an unlocked position shown in FIG. 4. When in the locking position, the locking arm 230 will clamp onto the outer end 236 of the front clam shell member 238. The rear end of the front clam shell member 238 is pivotally attached by means of a pivot pin 240 to the upstanding member 228. Pivot pin 240 also pivotally mounts the rear end of a rear clam shall member 242 to the upstanding member 228. The outer end 244 is to connect with the upstanding member 226 with locking arm 232 being pivotable to clamp onto the outer end 244. When the front clam shell member 238 is in the closed position, as is shown in FIG. 5, the front clam shell member 238 abuts against a front plate 246 which is mounted by fasteners 248 to the upstanding members 226 and 228. In a similar manner a rear plate 250 is mounted by the same fasteners 248 against the rear surface of upstanding members 226 and 228. The rear clam shell member 242, when in the closed position, is to abut against the top edge of the rear plate 250. The pivot pin 234 also passes through a hole 252 formed within the front plate 246 and a hole 254 formed within the rear plate 250.

Formed substantially at the longitudinal midpoint of the front plate 246 is half a hole shaped recess 256. A similar half a hole shaped recess 258 is formed within the rear plate 250. Formed within the front clam shell member 238 is a half a hole shaped recess 260. A similar half a hole shaped recess 262 is formed within the rear clam shell member 242. A pair of slots 264 is formed alongside recess 256 within the front plate 246. The purpose of the slots 264 is to allow slightly different size tubes to be clamped and allow slight expansion of the recess 256 when a tube 140 to be welded is mounted within the recess 256. It is to be understood that there are similar such slots 264 formed alongside each of the recesses 260 and 262. It is also to be understood that although this specification is described in relation to a single tube 140, it is actually in most instances meant to mean a pair of tubes 140 which is located in an axially aligned edge abutting relationship with the edge 270 being located directly adjacent the welding electrode 134.

Figure 2:
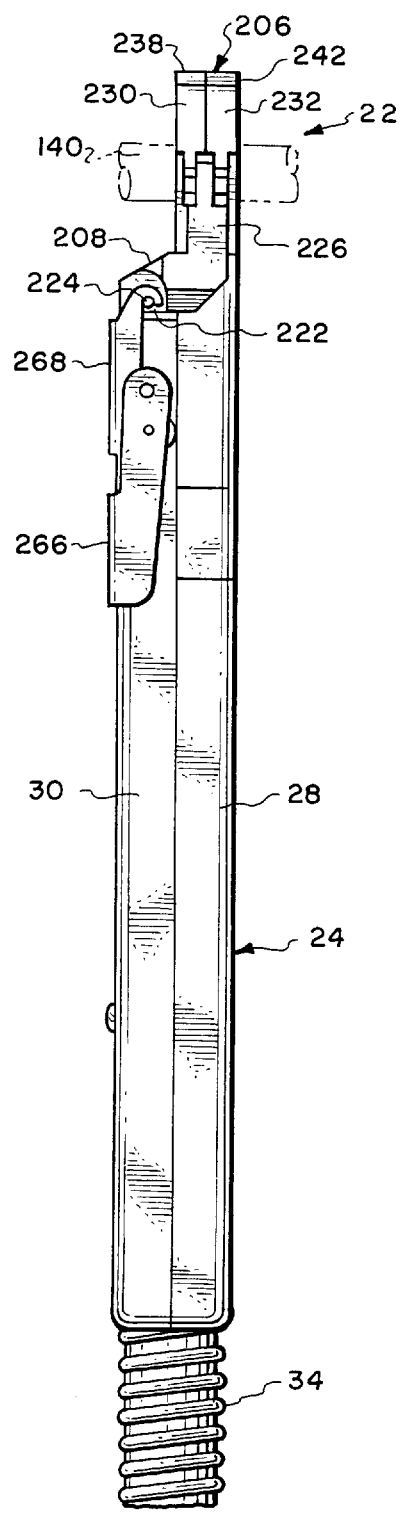
FIG. 2 is a right side elevational view of tube welding apparatus of this invention showing the torch housing being lockingly held in a secure position to the drive housing.

When the tube clamping assembly 206 is mounted on the mounting block 198, some means must be employed to fix in position the tube clamping assembly 206 on the mounting block 198. In order to achieve this, there is utilized a toggle clamp assembly in the form of a pivot bar 266 and a hook bar 268 which are pivotally connected together. The hook bar 268 is caused to engage with the pins 224 and then the pivot bar 266, which is pivotally mounted on the part 30, is then pivoted from the position shown in FIG. 3 of the drawings to a position flush against part 30 which is shown in FIGS. 1 and 2 of the drawings. This will result in an over-the-center locking action clamping onto the pins 224. The result is the tube clamping assembly 206 is tightly secured onto the mounting block 198. When it is desired to disengage the tube clamping assembly 206, it is only necessary to pivot the pivot bar 266 to the open position shown in FIG. 3. Hook bar 268 pushes assembly 206 upward (toward tube 140) when pivot bar 266 is being pivoted in the direction of arrow 265. Once assembly 206 is disengaged from dowel pins 210, it can be freely removed.

The operation of the first embodiment 22 of this invention is as follows: the locking arms 230 and 232 are to be located in the open position which is depicted in FIG. 3. The clam shell members 238 and 242 are then physically moved to the open position as shown in FIG. 4. The first embodiment 22 is then located so the tubes 140 to be welded are placed against the recesses 256 and 258. The tubes 140 are located so that their edges abut forming edge abutment 270 with this edge abutment 270 being located directly in alignment with the welding electrode 134. The clam shell members 238 and 242 are then moved to the closed position with the locking arms 230 and 232 then being moved to the position shown in FIGS. 1, 2, 5 and 9 which have now tightly secured the tube clamping assembly 206 onto the tubes 140. The welding operation is then initiated with the electrical power being transmitted to the welding electrode 134. At the same time the rotor gear 128 is caused to rotate gears 126 and 124 which in turn are caused to rotate by the ring gear 108 which is driven by the spur or drive gear 82. The rotation of the rotor gear 128 causes the electrode 134 to move along the seam of the edge abutment 270 so that upon the rotor gear 128 making a three hundred sixty degree revolution, complete welding of tubes 140 has occurred. When inserting the tubes 140 in conjunction with the recesses 256 and 258, it is necessary that the cut-away area 130 of the rotor gear 128 align with cut-out areas 142 and 144. This will permit the tubes 140 to be inserted within the welding chamber 132. There is an arrangement consisting of switch 88, actuating button 90, right angle shaped actuator composed of outer leg 94 and inner leg 92, follower pin 96 and an annular groove 106 of the ring gear 108. This arrangement helps to align a cut-away area 130 of rotor gear 128 with cut-out areas 142 and 144 which has been previously described. Once the tubes 140 are welded, forming a single integral tube 140, the locking arms 230 and 232 are then disengaged which permits clam shell members 238 and 242 to be opened, thereby allowing disengagement of the first embodiment 22 from the tube 140. It is to be understood that the first embodiment 22 of this invention is designed to be usable in conjunction with tubes generally one-fourth to one-half inch in diameter.

When it is desired to use the same welding procedure in conjunction with tubes that are from one-sixteenth to one-quarter inch in diameter, it is intended that the second embodiment 272 of this invention be utilized which is shown in FIGS. 12–20 of this invention.

The second embodiment 272 utilizes the same drive housing 24. The main distinction of the second embodiment 272 from the first embodiment 22 is that the second embodiment 272 is designed to weld smaller diameter tubes. Also, since smaller diameter tubes may be located in yet further confined quarters, it is important that the torch housing 274 be constructed still smaller in size than the first embodiment 22 of torch housing 26.

The torch housing 274 is similarly constructed of a cover 276 and a body housing 278. The body housing 278 is mountable within the cover 276 with there being an internal compartment 280 formed therebetween. Within the cover 276 there is mounted a ring gear 282 which is in engagement with the spur or drive gear 82. The ring gear 282 is also in engagement with two idler gears 284 and 286 with the idler gears 284 and 286 being in engagement with a rotor gear 288. The rotor gear 288 has a welding electrode 290 fixedly mounted therein by a set screw 292. The rotor gear 288 includes a cut-out area 294 which permits transverse access of a pair of tubes to be welded within the welding chamber 296. The ring gear 282 includes an annular groove 298 which is continuous with the exception of a hiatus in the form of a ridge 300. A follower pin 302 is mounted within hole 304 formed within the body housing 278. The follower pin 302 rides within the annular groove 298. The follower pin 302 is to abut against the outer leg 94 of the right angle plate which is mounted within the recess 102 formed within the abutting face 104 of the part 30. The ridge 300 functions in the same manner as ridge 110 to operate the switch 88.

Figure 17:
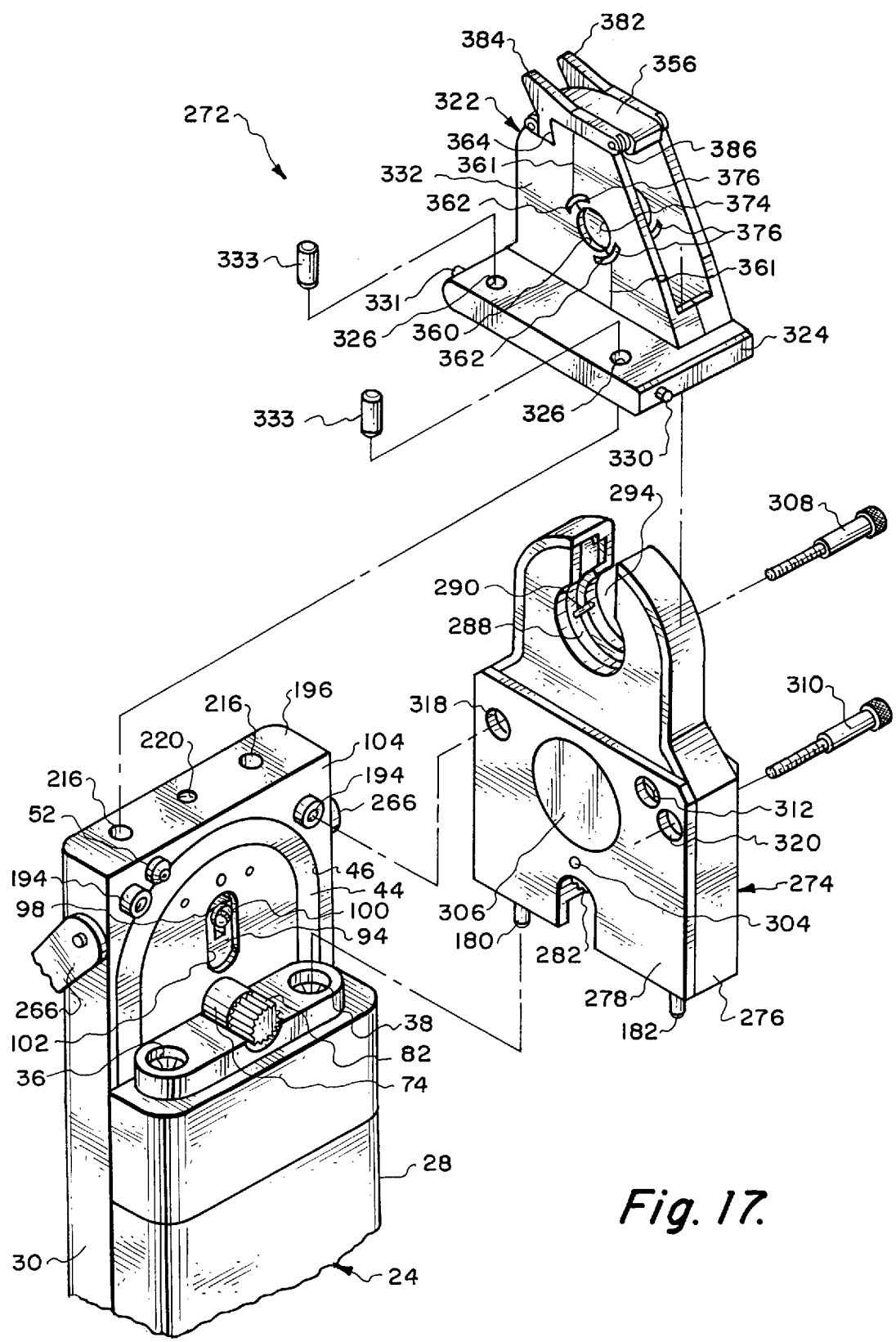
FIG. 17 is an exploded isometric view of the second embodiment of the tube welding apparatus of this invention.
Figure 18:
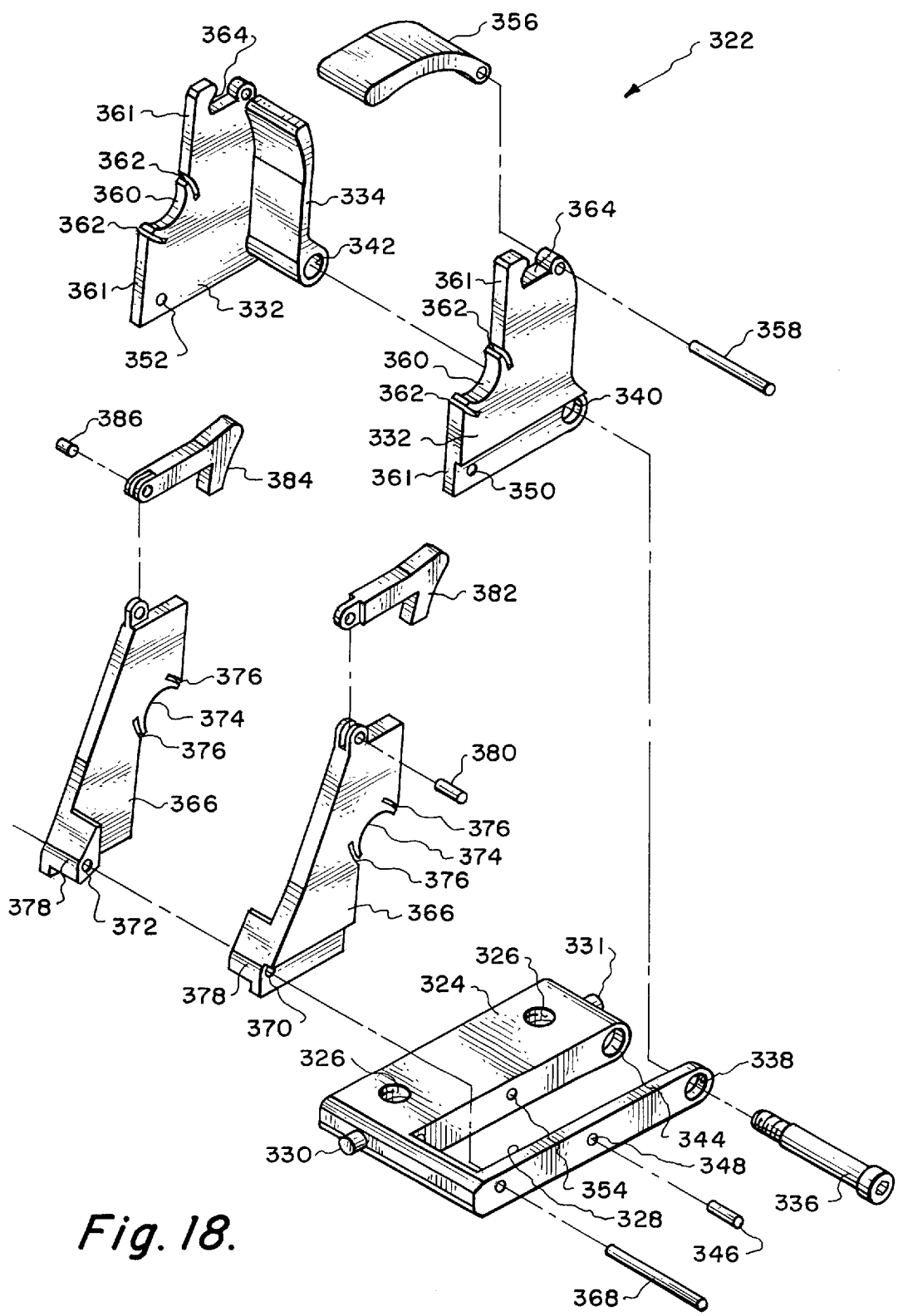
FIG. 18 is an exploded isometric view of the clamping assembly that is utilized in conjunction with the second embodiment of the tube welding apparatus of this invention.

It is to be understood that there will be a brush (not shown) similar to brush 170 that will be in contact with the rotor gear 288. This brush has plugs 180 and 182 that respectively plug into the sockets 38 and 36. This brush will be in contact with the mica disc, which is not shown, which in turn is placed against the copper plug 306. The copper plug 306 functions as a heat sink to remove the excessive heat of welding to be absorbed by the water being connected within the pipe 44. The plugs 180 and 182 for the brush (not shown) are shown in FIG. 17.

The body housing 278 is fixedly secured to the abutting face 104 by fasteners 308 and 310. Fastener 308 connects with body housing 278 by threads formed within body housing 278 and the other fastener 310 connecting with the body housing 278 in a same manner. Short centering sleeves 194 are being used within openings on face 196 and holes 318 and 312 of body housing 278 to center body housing 278 on the drive housing 24.

The inert gas is to be supplied through the sleeve 52 into opening 312. From the opening 312 the inert gas is supplied across the relief 314 through holes 316 to be discharged in the area of the welding chamber 296. The fastener 308 extends through a hole 318 formed within the body housing 278. The major physical distinction of the second embodiment 272 from the first embodiment 22 is that the head area of the torch housing 274 (where the rotor gear 288 is located) is smaller in size than the corresponding portion of the tube clamping assembly 206. The reason this can be made smaller is that the second embodiment 272 is to be usable to weld smaller sizes of tubes. When locking into position the tube to be welded to the second embodiment 274, there is utilized the tube clamping assembly 322. The tube clamping assembly 322 includes a mounting base 324. The mounting base 324 includes a pair of holes 326. Dowel pins 333 are each mounted by an interference fit in a hole 326 with there being a separate pin 333 for each hole 326. The bottom ends of the each dowel pin 333 fits into a mating hole 216 of the part 30. This insures proper location of clamping assembly 322 on drive housing 24. The mounting base 324 also includes a large cut-out area 328. The mounting base 324 also includes protruding pins 330 and 331. The pins 330 and 331 are to connect with hook bar 268 so as to fixedly mount the tube clamping assembly 322 onto the drive housing 30.

A pair of positioning plates 332 are placed within the large cut-out area 328 with there being a spacer member 334 integrally connected to one of the plates 332. The spacer member 334 abuts against the other plate 332 functioning to maintain a certain established spacing between plates 332. A large shoulder screw 336 is conducted through hole 338 formed in the mounting base 324 and into hole 340 formed within one positioning plate 332, through hole 342 formed within spacing member 334, through an appropriate similar hole (not shown) formed within the remaining positioning plate 332, and then finally engaging with threads of hole 344 of mounting base 324. A short pin 346 is mounted through hole 348 formed within the mounting base 324 and then extends within hole 350 formed within one of the positioning plates 332. A similar short pin (not shown) is to be mounted within a hole 352 formed within the remaining positioning plate 332 and then within hole 354 also formed within the mounting base 324. The result is the positioning plates 332 are fixedly mounted in position on the mounting base 324. A lid 356 is pivotally mounted by pin 358 between the positioning plates 332 with one edge of the lid 356 being positioned directly adjacent the upper edge of the spacer member 334. It is the function of the lid 356 to partially enclose the welding chamber 296. The reason for this partial enclosure is to keep the inert gas somewhat confined within the welding chamber 296. The lid 356 can be pivoted to the position shown in FIGS. 15 and 16 in order to gain access into the welding chamber 296. This access into the welding chamber 296 may merely be for the purposes of observing the position of the welding electrode 290 relative to the tube that is to be welded and to be able to visually check the absence of the gap between tubes to be welded.

Each of the positioning plates 332 includes a recess 360. The recess 360 is approximately half a circle. Located directly adjacent to each recess 360 and formed within each positioning plate 332 is a pair of slots 362. The tube to be welded is to be positioned across the recesses 360 with the weld line (not shown) being located equidistance from the positioning plates 332. It is to be understood that the welding electrode 290 is to be positioned directly adjacent this weld line. Each of the positioning plates 332 includes a locking recess 364.

A pair of movable plates 366 also is to be located within the large cut-out area 328. The movable plates 366 are maintained within the large cut-out area by pivot pin 368 which passes through appropriate holes formed within the mounting base 324 and holes 370 and 372 formed within the movable plates 366. Each of the movable plates 366 includes semi-circular shaped recesses 374. Alongside each of the recesses 374 and formed within the plates 366 are slots 376. Each of the movable plates 366 has an extension 378. The extensions 378 are to be located in an abutting relationship when the movable plates 366 are installed in position within the large cut-out area 328. The extensions 378 maintain the desired spacing between the movable plates 366. A movable plate 366 is in alignment with a positioning plate 332.

It is to be noted that the cut line 361 for the positioning plates 332 is vertical whereas the cut line 251 for the first embodiment 22 is horizontal. There are three distinct purposes for this configuration. First, this offset vertical cut line 361 allows lesser width of tube clamping assembly 322 measured from left to right on FIG. 15. It makes the aforementioned tube clamping assembly 322 better suited for operation in confined areas. The movable plates 366 are in a surface contact between each other and the mating surface of mounting base 324. This surface contact facilitates better heat transfer away from recesses 374 into base 324 and further into drive housing 24 which is water cooled as was described previously. This heat transfer makes tube clamping assembly 322 better suited for high duty cycle welds. The angled portion of the cut line 361 hides welding electrode 290 therefore protecting it from accidental destructive contact with tubes 140 to be welded while those are being mounted in tube clamping assembly 322.

Pivotally mounted by means of a pivot pin 380 to one of the movable plates 366 is a hook bar 382. A similar such hook bar 384 is mounted by a pivot pin 386 to the other movable plate 366. The movable plates 366 are capable of being pivoted in the direction of arrow 388 in FIG. 16 from the closed position shown in FIG. 15 to an open position shown in FIG. 16. With the movable plates 366 in the open position as shown in FIG. 16, the second embodiment 272 of this invention can be placed in conjunction with a tube to be welded and as previously mentioned, actually a pair of tubes in an edge abutting relationship. The tube is to be placed in conjunction with the recesses 360 with the recesses 360 being designed to support a tube one-sixteenth inch in diameter. If a larger tube such as an eighth or a quarter of an inch in diameter is placed in conjunction with the recesses 360, the slots 362 are to permit the recesses 360 to expand slightly to accommodate this larger sized tube. This expansion trait is also similarly to occur in conjunction with the recesses 374 when the movable plates 366 are moved to the closed position as shown in FIG. 15. If the expansion is not sufficient, another tube clamping assembly could be used with the appropriate size of recesses 360 and 374. In the closed position the lid 356 is to be moved from the open dotted line position of FIG. 15 to the closed position as depicted by arrow 390. When in the closed position the hook members 382 and 384 are to engage with their respective locking recess 364 of a positioning plate 332. In this particular position the tube to be welded is now fixed, and the welding procedure is to be initiated. The welding procedure of the second embodiment 272 is precisely the same as the welding procedure previously discussed in relation to the first embodiment 22.

What is claimed is:

1. A small size tube welding apparatus for welding a tube of a group of tubes comprising:

a drive housing, said drive housing having a first electrical connection means;

a supply conduit connected to said drive housing, said supply conduit for supplying inert gas, cooling water and electricity to said drive housing;

a torch housing having a second electrical connection means, said second electrical connection means to electrically connect with said first electrical connection means, said second electrical connection means to engage with said first electrical connection means in a single engaging motion interlocking said drive housing and said torch housing, said second electrical connection means to disengage from said first electrical means in a single disengaging motion separating said torch housing from said drive housing, said drive housing having means to electrically connect with different said torch housings with said drive housing only being connected to one said torch housing at a time, said torch housing to fixedly mount a said tube to be welded with each said torch housing having means to connect with a different range of sizes of said tubes; and said torch housing including a heat sink, said heat sink functioning to conduct the heat produced during the welding operation away from said apparatus.

2. A small size tube welding apparatus for welding a tube of a group of tubes comprising:

a drive housing, said drive housing having a first electrical connection means;

a supply conduit connected to said drive housing, said supply conduit for supplying inert gas, cooling water and electricity to said drive housing;

a torch housing having a second electrical connection means, said second electrical connection means to electrically connect with said first electrical connection means, said second electrical connection means to engage with said first electrical connection means in a single engaging motion interlocking said drive housing and said torch housing, said second electrical connection means to disengage from said first electrical means in a single disengaging motion separating said torch housing from said drive housing, said drive housing having means to electrically connect with different said torch housings with said drive housing only being connected to one said torch housing at a time, said torch housing to fixedly mount a said tube to be welded with each said torch housing having means to connect with a different range of sizes of said tubes; and said torch housing including a welding electrode mounted within a rotor gear, said rotor gear to be rotated about said tube, a brush extending from said second electrical connection means, said brush to be in continuous electrical connection with said rotor gear.

3. The small size tube welding apparatus as defined in claim 2 wherein:

said brush including biasing means for insuring a tight physical connection with said rotor gear.

4. A small size tube welding apparatus for welding a tube of a group of tubes comprising:

a drive housing, said drive housing having a first electrical connection means;

a supply conduit connected to said drive housing, said supply conduit for supplying inert gas, cooling water and electricity to said drive housing;

a torch housing having a second electrical connection means, said second electrical connection means to electrically connect with said first electrical connection means, said second electrical connection means to engage with said first electrical connection means in a single engaging motion interlocking said drive housing and said torch housing, said second electrical connection means to disengage from said first electrical means in a single disengaging motion separating said torch housing from said drive housing, said drive housing having means to electrically connect with different said torch housings with said drive housing only being connected to one said torch housing at a time, said torch housing to fixedly mount a said tube to be welded with each said torch housing having means to connect with a different range of sizes of said tubes; and said torch housing comprising a body housing to which is removably secured a cover, said body housing and said cover forming an internal chamber, a rotor gear mounted within said internal chamber, a brush mounted within said internal chamber, said brush being in continuous electrical connection with said rotor gear, said torch housing including a welding chamber adapted for receiving a tube to be welded, said body housing having gas passage means for supplying insert gas to said welding chamber.

5. The small size tube welding apparatus as defined in claim 4 wherein:

said brush including biasing means for insuring a tight physical connection with said rotor gear.

6. The small size tube welding apparatus as defined in claim 4 wherein:

said rotor gear being mounted within said internal chamber, said rotor gear being rotatable about said tube that is to be welded, a brush extending from said second electrical means, said brush being in continuous electrical connection with said rotor gear, said rotor gear surrounding said welding chamber.

7. The small size tube welding apparatus as defined in claim 6 wherein:

said internal chamber including a driven gear, operation of said driven gear is by a drive gear which causes rotation of said rotor gear, said drive gear being mounted on said drive housing, said driven gear including a follower path, said follower path including a hiatus, a follower mounted in said cover, said follower being movable within said follower path during rotation of said driven gear, upon said follower contacting said hiatus said drive gear being deactivated.

8. The small size tube welding apparatus as defined in claim 7 wherein:

said driven gear being rotatable within a rotational plane, said follower being movable in a direction perpendicular to said rotational plane.

9. The small size tube welding apparatus as defined in claim 8 wherein:

switch means mounted within said drive housing, said switch means for controlling the operation of said drive gear, said switch means being movable between an on and off position by said follower.

10. The small size tube welding apparatus as defined in claim 4 wherein:

said torch housing including a heat sink, said heat sink functioning to conduct the heat produced during the welding operation away from said apparatus, said heat sink comprising said brush and a plug mounted within said body housing, both said brush and said plug being constructed of a material that readily conducts heat.

11. A small size tube welding apparatus for welding a tube of a group of tubes comprising;

a drive housing, said drive housing having first electrical connection means;

a torch housing having second electrical connection means, said second electrical connection means to electrically connect with said first electrical connection means, said second electrical connection means to engage with said first electrical connection means by interlocking said drive housing with said torch housing, said second electrical connection means being disengageable from said first electrical connection means separating said torch housing from said drive housing, said drive housing having means to be capable of electrically connecting with different said torch housings with said drive housing only being connected to one said torch at a time, said torch housing to fixedly mount a said tube to be welded with each said torch housing having means to connect with a different range of diameters of said tubes; and said torch housing including a heat, sink heat sink functioning to conduct the heat produced during the welding operation away from said apparatus.

12. The small size tube welding apparatus as defined in claim 11 wherein:

said heat sink comprising a brush and a plug mounted within said housing, both said brush and said plug being constructed of a material that readily conducts heat.

13. A small size tube welding apparatus for welding a tube of a group of tubes comprising;

a drive housing, said drive housing having first electrical connection means;

a torch housing having second electrical connection means, said second electrical connection means to electrically connect with said first electrical connection means, said second electrical connection means to engage with said first electrical connection means by interlocking said drive housing with said torch housing, said second electrical connection means being disengageable from said first electrical connection means separating said torch housing from said drive housing, said drive housing having means to be capable of electrically connecting with different said torch housings with said drive housing only being connected to one said torch housing at a time, said torch housing to fixedly mount a said tube to be welded with each said torch housing having means to connect with a different range of diameters of said tubes; and said torch housing including a welding electrode mounted within a rotor gear, said rotor gear to be rotated about said tube, a brush extending from said second electrical connection means, said brush to be in continuous electrical connection with said rotor gear.

14. The small size tube welding apparatus as defined in claim 13 wherein:

said brush including biasing means for insuring a tight physical connection with said rotor gear.

15. A small size tube welding apparatus for welding a tube of a group of tubes comprising;

a drive housing, said drive housing having first electrical connection means;

a torch housing having second electrical connection means, said second electrical connection means to electrically connect with said first electrical connection means, said second electrical connection means to engage with said first electrical connection means by interlocking said drive housing with said torch housing, said second electrical connection means being disengageable from said first electrical connection means separating said torch housing from said drive housing, said drive housing having means to be capable of electrically connecting with different said torch housings with said drive housing only being connected to one said torch housing at a time, said torch hosing to fixedly mount a said tube to be welded with each said torch housing having means to connect with a different range of diameters of said tubes; and said torch housing comprising a body housing to which is removably secured a cover, said body housing and said cover forming an internal chamber, a rotor gear mounted within said internal chamber, a brush mounted within said internal chamber, said brush being in continuous electrical connection with said rotor gear, said torch housing including a welding adapted for receiving a tube to be welded, said body housing having gas passage means for supplying inert gas to said welding chamber.

16. The small size tube welding apparatus as defined in claim 15 wherein:

said brush including biasing means for insuring a tight physical connection with said rotor gear.

17. The small size tube welding apparatus as defined in claim 15 wherein:

said rotor gear being mounted within said internal chamber, said rotor gear being rotatable about said tube that is to be welded, a brush extending from said second electrical means, said brush being in continuous electrical connection with said rotor gear.

18. The small size tube welding apparatus as defined in claim 17 wherein:

said internal chamber including a driven gear, operation of said driven gear is by a drive gear which causes rotation of said rotor gear, said drive gear being mounted on said drive housing, said driven gear including a follower path, said follower path including a hiatus, a follower mounted in said cover, said follower being movable within said follower path during rotation of said driven gear, upon said follower contacting said hiatus said drive gear being deactivated.

* * * * *